A. B. KEMPEL.
POROUS RUBBER FABRIC AND METHOD OF PRODUCING THE SAME.
APPLICATION FILED JULY 20, 1916.
Patented June 12, 1917.
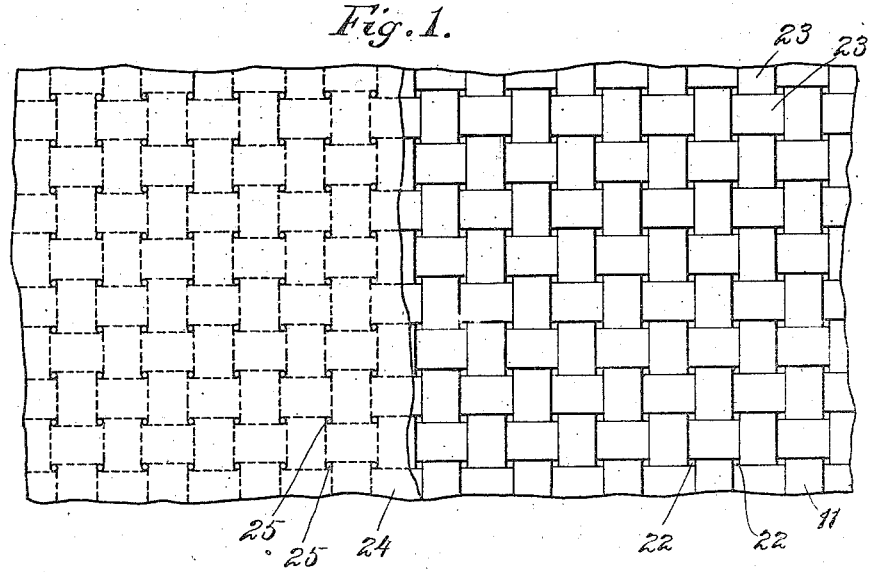
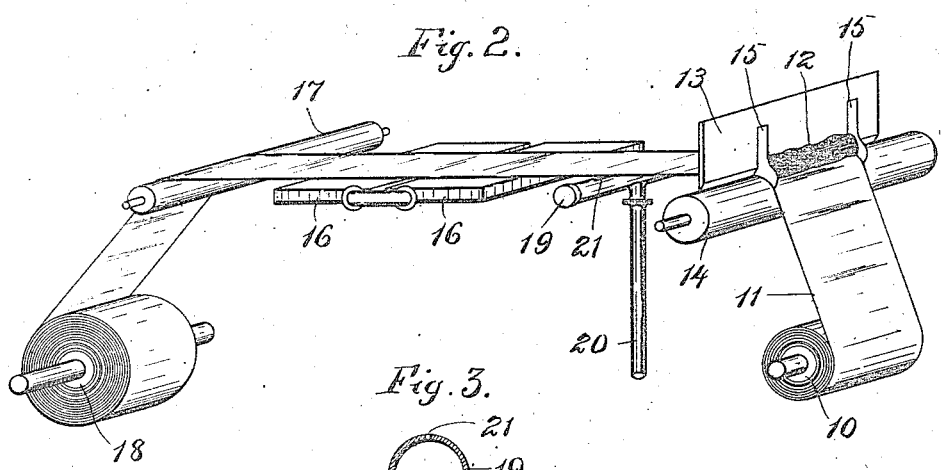
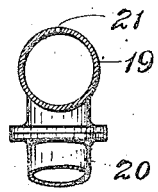
INVENTOR.
A. B. Kempel
BY Robert M. Pierson
ATTORNEY

UNITED STATES PATENT OFFICE.

ARTHUR B. KEMPEL, OF AKRON, OHIO, ASSIGNOR TO THE B. F. GOODRICH COMPANY, OF NEW YORK, N. Y., A CORPORATION OF NEW YORK.

POROUS RUBBER FABRIC AND METHOD OF PRODUCING THE SAME.

1,229,284.     Specification of Letters Patent.     Patented June 12, 1917.

Application filed July 20, 1916. Serial No. 110,335.

*To all whom it may concern:*

Be it known that I, ARTHUR B. KEMPEL, a citizen of the United States, residing at Akron, in the county of Summit and State of Ohio, have invented certain new and useful Improvements in Porous Rubber Fabrics and Methods of Producing the Same, of which the following is a specification.

The object of this invention is to provide a flexible sheet of water-proof material traversed by a relatively large number of fine holes.

Of the accompanying drawings,

Figure 1 is a magnified view of a waterproof woven fabric embodying my invention, with a portion of the proofing material removed from one side.

Fig. 2 is a perspective view showing the process of coating the fabric and blowing holes through the coating.

Fig. 3 is a cross-section of the compressed-air nozzle.

The preferred mode of carrying out my invention consists, in brief, in providing a woven textile fabric with one or more coats of rubber in an ordinary spreading machine, blowing holes through the rubber coating before it has completely dried, and finally vulcanizing the rubberized porous fabric.

For example, in Fig. 2, 10 is a stock-roll from which the uncoated cotton or other woven textile fabric 11 is unwound, and 12 is a batch of vulcanizable rubber cement placed on the fabric in the cleft between a scraper or spreader blade 13 and a roller 14, and confined at its ends by the side plates 15. 16, 16 are two of the series of steam-heated drying plates over which the coated fabric passes in order that the solvent may be driven off from the cement by evaporation. 17 is the fabric guide-roller at the rear end, and 18 is the take-up roller for the coated fabric, these parts forming the essentials of an ordinary rubber spreading machine.

Arranged transversely underneath the coated fabric, between the spreading blade 13 and the first of the drying plates 16, is a nozzle pipe 19 attached to a compressed-air supply pipe 20 and having a narrow slot 21 in its upper wall, by means of which compressed air or other suitable fluid under pressure, may be blown through the fabric, and the partially-dried rubber coating thereon, with the effect of breaking the coating in numerous places at the points of least resistance to the passage of air, namely, over the interstices 22 (Fig. 1) between the threads 23 of the fabric. In this operation, none, or substantially none, of the rubber is removed. 24 is the rubber coating shown on the left-hand part of Fig. 1, and 25, 25 represent conventionally the holes in the coating.

The rubber partly impregnates the textile fabric and it is ordinarily desirable to coat the same on both sides, the fabric being turned over and repassed through the spreading machine for that purpose and preferably being given more than one coating on the side which is exposed to a liquid when in use and subjected to more or less wear. Each successive coat, after being spread, is blown through with air, in the manner described in connection with Fig. 2, to break the rubber films over the interstices of the fabric. It is found that the exposed portions of each thread in the fabric become practically surrounded with rubber, so that the capillary action of the yarn, which is manifest in uncoated textile fabric, is largely overcome. Furthermore the rubber coating embeds or locks up the projecting fine filaments or fuzz upon the yarn. Finally, the rubber coating is cured and set in the form thus imparted, by vulcanizing the fabric. The best way of performing this step, if the fabric is retained in long lengths, is to vulcanize it in a belt press, after which it may be cut up into squares or pieces of the desired form.

The qualities thus imparted make this product useful in various situations, and particularly as the upper member or sheet of a diaphragm adapted to be used in concentrating metallic ores by the oil-flotation process, which requires the bubbling of compressed air in very fine streams through the bottom of a tank in which the liquid and suspended solid matter are held during treatment. The diaphragms heretofore in use in such apparatus have proved unsatisfactory and short-lived, and my invention has been found to afford a substantial improvement in that connection. It is desirable in an ore-flotation diaphragm that the holes shall be very small relatively to the intervening impervious portions of the diaphragm. A sheet of woven fabric, embodying my invention and suitable for the purpose mentioned, shows its porous character when held to the light, although it is not essential that every one of the interstices should be open, and some of the holes are so small as to be invisible to the naked eye.

I claim:

1. A textile fabric open or porous at the interstices between the threads, and gum-coated on the rest of its surface.

2. A fabric of interwoven fibrous threads, surfaced with rubber and porous at the interstices between the threads.

3. A closely-woven textile fabric continuously surfaced with vulcanized rubber which substantially incases the exposed portions of the individual threads, the rubber coating having fine holes through it at the interstices between the threads.

4. The process of making water-proof, porous fabric which consists in spreading rubber cement on the fabric, forcing a fluid under pressure through the fabric and the coating to perforate the latter, then evaporating the solvent and vulcanizing the coating.

5. The process of making water-proof, porous, textile fabric which consists in spreading the fabric with successive coats of rubber cement, perforating the coats successively over the interstices between the threads by blowing compressed air therethrough, and vulcanizing the rubberized fabric.

6. The process of making water-proof, porous, textile fabric which consists in coating and partially impregnating the threads of the fabric with rubber cement to an extent sufficient substantially to embed the projecting fibers and overcome the capillarity of the threads, perforating the coating at the interstices by fluid pressure, evaporating the solvent in the cement, and vulcanizing the rubber.

In testimony whereof I have hereunto set my hand this twelfth day of July, 1916.

ARTHUR B. KEMPEL.